May 7, 1968            T. W. JOHNSON            3,381,737
TUBELESS TIRE FOR USE WITH SIDEWALL THRUSTING BUFFERS
Filed May 19, 1966
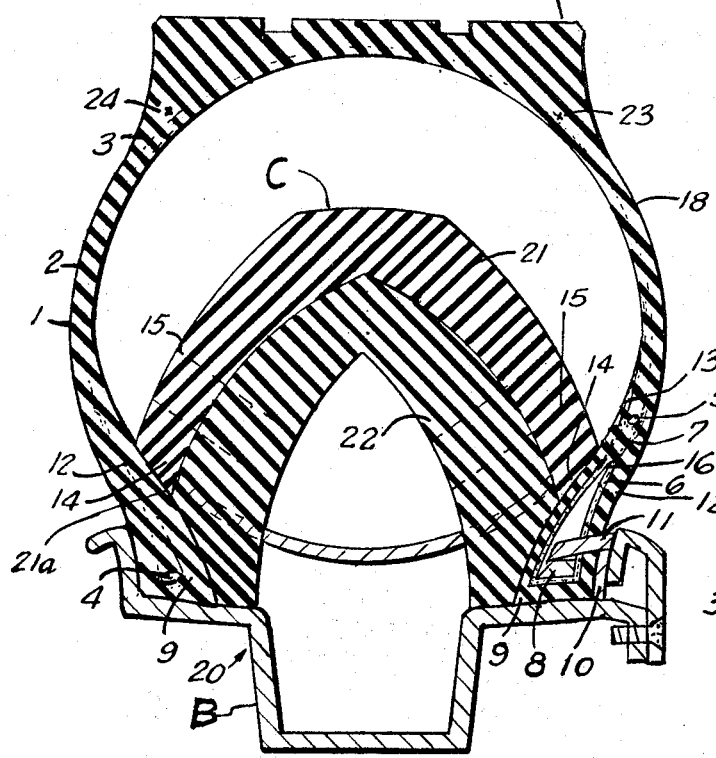
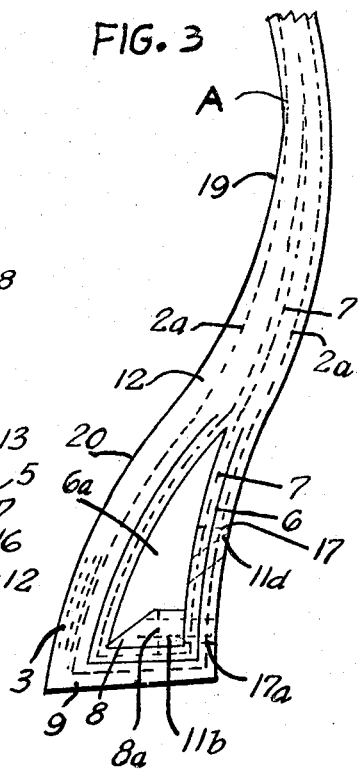
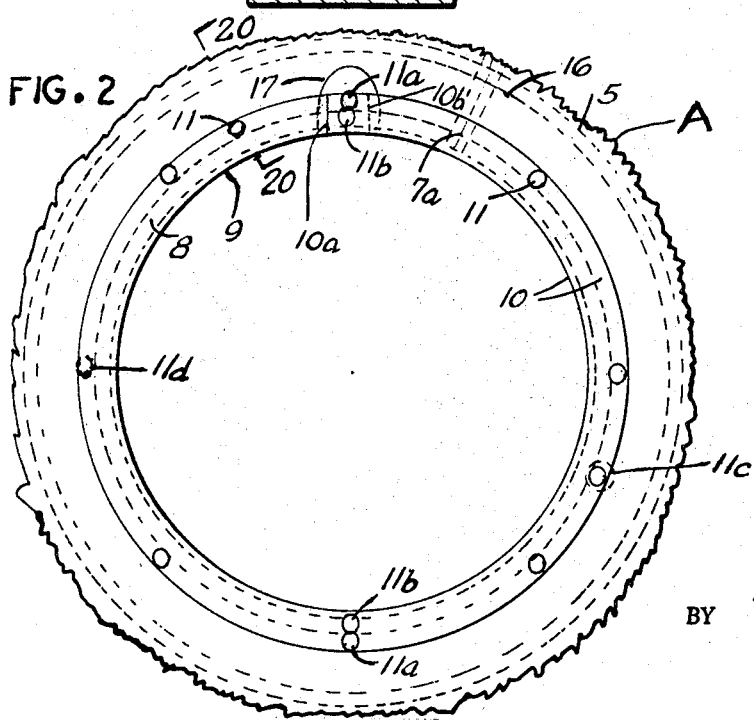
INVENTOR.
Tilden W. Johnson
BY

United States Patent Office 3,381,737
Patented May 7, 1968

3,381,737
TUBELESS TIRE FOR USE WITH SIDEWALL THRUSTING BUFFERS
Tilden William Johnson, 5630 Sawtelle Blvd., Culver City, Calif. 90230
Continuation-in-part of application Ser. No. 424,746, Jan. 11, 1966. This application May 19, 1966, Ser. No. 552,383
16 Claims. (Cl. 152—391)

ABSTRACT OF THE DISCLOSURE

This invention comprises a buffer useable, thin sidewall, thick radially reinforced bead and adjacent annulus tubeless tire with a low profile action in thin sidewalls above said thickened bead area with one or more beads and sidewall annulus extensible because only radially reinforced, said extensible bead formed by leaving usual wire bead core space hollow with an aperture from tire bead outside to said hollow bead space through which a substantially inextensible bead strap can be inserted and tensioned and fastened to an airtight fit of said bead to a rim.

One version of said strap consisting of severable, connectable sections.

One version of said bead structure being formable by use of a high heat resistant, stretchable hollow tube as a tire bead core for anchoring carcass reinforcement with radial reinforcements extending for overlap with all direction tire reinforcement that marks the termination of area extensibility. Said bead structure further strengthened by use of an outside bead reinforcement similar to a section of a rim flange, or a rim flange, having bolting means to attach to said tire bead core inextensible reinforcement.

---

The present invention is a continuation-in-part improvement in my copending application Ser. No. 424,746, now Patent No. 3,247,879, which was a continuation-in-part of my Ser. No. 175,926, for a "High Speed Safety Wheel and Components Therefor," now divisional Patent No. 3,172,447.

This invention relates to improvements in tubeless tires that increases the tires' utility for use with my recently invented hard shell over a resilient rubber tire shaped interior structure wherein said hard shell consisting of a cap and sidewall annulus gains flexibility and lateral stability by bearing on the enclosing tire sidewall and bead on top of the rim tire retaining flange and under shock loads thrusts laterally and radially against the enclosed tire sidewalls. This new type rim extending buffer being wide, high and flexible see my invention No. 3,250,310.

An object of the present invention is to provide a tubeless tire more practical to manufacture and better constructed to resist the new use wear of my aforesaid recently invented flexible rim extending buffer that in shock loads thrusts against the enclosing tire sidewall and bead just above and on the top of the rim tire retaining flange and to provide a more practical manufacture for attaining needed bead and sidewall extensibility so said enclosing tubeless tire can stretch over some types of the aforesaid newly invented wide, high and flexible buffer, used with standard drop center rims that do not have a removable flange.

Another object of this invention is to increase the factor of safety in high speed safety wheels by a tire invention that makes assembly of a safety wheel composed of a rim, a rim extending flexible buffer and an enclosing tire.

Another object of the present invention is to provide a bead structure wherein a flexible tire bead shape tube of high heat resistance and great Shore hardness and stretchability can be substituted for the usual wire bead core. Thus tire carcass reinforcements that now wrap around said wire bead cores can wrap around this bead core. Since the tube is stretchable, the bead can stretch along with the sidewall annulus wherein only radial carcass reinforcing is present. Since said tube is hollow, the usual wirelike bead core can be inserted through suitable apertures. Thus said constructed bead can be stretched when the wire core is unfastened or made inextensible when said wire core is fastened by a suitable fastening device without interfering with usual tire bead reinforcement manufacture technique. Said bead core tube can be manufactured from a composition of rubber having a high silicone, sulphur and carbon content whereby its approximate capacity to resist heats of 500 degrees will enable tire vulcanization to occur around it at heats of 280 to 300 degrees.

Another object of this invention is to set forth an improved technique for strengthening the tire bead core by using an outside bead radial thin reinforcement tensionable to a substantially, fastenable, inextensible structure whose strength is transmitted by bolt or dowel like projections to the base of the tire bead core reinforcement through suitable apertures in the outside tire bead.

These and other objects of the invention will become apparent from the following description of the invention, taken in connection with the accompanying drawings, in which:

FIGURE 1 is a transverse sectional view of the tire and bead taken at line 20—20 of FIGURE 2.

FIGURE 2 is a fragmentary elevation view of the tire and external bead reinforcing strap and related structure.

FIGURE 3 is a fragmentary enlarged cross section at line 20—20 of FIGURE 2 showing an alternate bead structure in some respects and tire carcass reinforcing which FIGURE 1 is too crowded to show. The outside bead reinforcement items 10 and 11 are omitted to better show tire bead structure. However item 17a indicates items 11 and 11a can be located lower in bead and item 10 and strap 8 tapped for bolt securing through item 10 or a rim flange.

The letter A represents the novel type tire of this invention. Note the tire has the usual cap and one bead and sidewall, and in some cases has the same substantially inextensible wire bead core and radial, circumferential and diagonal carcass structure common to current tubeless tire structure with the exception the bead and adjacent sidewall is thicker and the tire casing from the radial tire centerline or point of greatest tire lateral diameter to the cap is somewhat thin so the tire sidewall in its upper section flexes somewhat like a low profile tire flexes to prevent heat build-up as the upper thin tire sidewall flexes more so the lower tire sidewall can flex less. Note the said tire cross section, circumferential and diagonal carcass reinforcement terminates in the extensible sidewall annulus wrapped around a circumferential inextensible wire as in item 5 and items 23 and 24 being likely termination points of wire item 5. Note how the radial bead and carcass reinforcement item 7 can overlap item 5 and could also overlap to point 23 or 24 or could wrap around wires at said points. Note how bead tube 6 of stretchable high heat resistance composition can be formed to better utilize radial carcass and bead reinforcements and facilitate the wrapping around of carcass reinforcement like the usual wire core in item 4. Note how fastenable and unfastenable bead strap 8 is loose in hollow space 6a and how it can be fastened and used alone as the bead inextensible reinforcement after the tire is stretched over buffer C, and how item 8 can be reinforced with external bead reinforcement 10 assisted with dowel or bolt 11 inserted through tire hole to 11d to bead core. Note in cases of low tire air inflation pressure this tire can be used without 8 or 10 and can be used with either 8 or 10 singly or with both combined. Note tire sidewall and bead cutout to the bead hollow at one point 17 where 8 is fastened and unfastened and inserted and removed is bigger than usual tire apertures 11d.

Note how in FIGURE 2 strap 10 is dovetailed or overlapped and attached or fastened after tensioning by countersunk bolts, 11a and 11b. Other fastening devices can be used satisfactorily to fasten and unfasten 8. Note how by using a few or numerous screws 11a screwed into dowels or tapped holes in 8 as in 8a at FIGURE 3 reinforcements 8 and 10 can be joined. Likewise note how item 8 can be left untensioned and unfastened but by use of screws and dowels as indicated bead reinforcement 10 can be tightened alone to secure the bead to the rim at high tire inflation pressures when item 10 is fastened externally to the bead where it is easily accessible. Note at FIGURE 3 carcass reinforcements can be plural in any number of sections. Note how bead tube core radial reinforcements can be used in any number to overlap the point 12 in the tire where the buffer hard shell portion end at point 14 of shell 21 of buffer C thrusts against the tire sidewalls. Note that while the rim B is a recently invented rim that its use will enable the fastening of 8 and/or 10 off the rim when no tensioning is required but that when removable flange of the rim is secured the tire bead is secured to an airtight fit in its location as shown in FIGURE 1.

Note how all direction reinforcement item 2 can begin at bead wire 4 and wrap around another such wire at point 23 and then how bead core 6 with radial reinforcement 7 could extend up sidewall 18 and over the cap and wrap around a terminating wire at point 24 making a practical tire manufacturing construction, around which tire interior rubber can be vulcanized to an airtight fit or air sealing structure and rubber likewise vulcanized over the exterior tire sidewalls and cap. Note how the smaller bead diameter tire bead rubber item in 9 enables the stretched rubber bead 9 to retain air even when the tire carcass reinforcement are stressed as the tire carcass reinforcement stress does not fully communicate to the excess air sealing rubber on the tire bead toe and base at 9. Note that bead apertures 11d may only be radial slits, through which 11 and 11a can pass to bead core strap.

Letter B represents a recently invented rim and is shown here to illustrate the improvements in tire A and the need and usefulness of improvements in this tire invention. Note this rim that first appeared in my Ser. No. 175,926 for a High Speed Safety Wheel is invented especially for the combination shown.

Letter C represents the rim extending wide, high, flexible wheel buffer for greater braking efficiency and prevention of wheel drop and is now my Patent No. 3,250,310 and is shown here to clearly illustrate how this tire structure compensates for the increased wear said buffer places on the tire bead and sidewall and the necessity for a tire with one or more beads and sidewall annulus extensible for stretching over some types of said buffer when installing and dissembling the wheel. Item 21 represents the hard outer buffer shell mentioned herein and 14 is its termination point that tends to separate from the more resilient layer 22 and thus 14 thrusts straight against the tire sidewall instead of folding as tires usually fold under shock. Item 15 represents air circulation holes in said buffer which allows the upper tire enclosed air to communicate to the iron rim deep drop center of B where the iron can radiate the heat from the enclosed air made hot by high speed travel 300 times faster than the tire can radiate heat. Thus this tire with this buffer should wear much longer in its cap and be useable through several recaps whereas a tire enclosing another tire or buffer that covers the iron rim will overheat at high speed and tend to melt on the road in a few hundred or thousands of miles and perhaps blow out. This buffer affords absolute protection against tire lateral bead displacement in curves and dirt banked curves where dirt wedging is dangerous and effectively and certainly at all times prevents wheel drop in case of loss of tire air pressure, and the buffer has a flexibility when for instance hitting a curb like projection in the road that is almost equal to an air tire.

When bead strap 8 is in severable sections and tapped for bolts or bolts extend therefrom, it should be noted by bolting direct to holes in rim flange that tire carcass reinforcing is directly held by rim flange forming airtight fit.

Numeral 1 represents inextensible tire sidewall.

Numeral 2 represents 1 ply which could be several of tire carcass reinforcement extending diagonally, circumferentially, and radially which is the usual tubeless tire pattern of reinforcement.

Numeral 3 represents the possibility of several plies of tire carcass reinforcement.

Numeral 4 represents usual tubeless tire wire cores that are substantially inextensible.

Numeral 5 represents a circumferential wire in a tire sidewall or cap marking the termination point of some type of reinforcement which carcass reinforcement can wrap around for anchorage and 5 could have any desired location with 23 and 24 being good points.

Numeral 6 represents the walls of a bead-shaped extensible circumferential tire bead core around which tire carcass reinforcement can anchor by wrapping around in the manner of item 4.

Numeral 6a represents the hollow space in the bead tube core.

Numeral 7 represents radial reinforcements in the tire bead tube core 6 which can extend further radially than said bead hollow core tube extends.

Numeral 7a indicates there is a plurality of 7. See FIGURE 2.

Numeral 8 represents an insertable and removable substantially inextensible tire bead strap for hollow space 6a. This strap may consist of a plurality of severable connectable sections with threaded screw tapped holes to receive item 11a.

Numeral 8a represents a split overlap or dovetail in strap 8 at the point 17 location in FIGURE 2.

Numeral 9 represents the air sealing rim contacting tire bead having smaller diameter than rim tire bead seat, and independent of items 8 and 6 and 7 and 10, i.e. not affected by srain on said items.

Numeral 10 represents an external substantially inextensible exterior bead-shaped tire bead reinforcement fastenable from the tire outside, and 10a and 10b represents apertures and fasteners in the ends of 10 overlap.

Numeral 11 represents a dowel attached to item 10, and 11a represents a bolt in lieu of dowel 11 and 11b represents a tapped hole for fastening purposes in item 8 as at 8a in FIGURE 3 and 11c represents a tapped hole in a bushing attached to item 8 for 11a, and 11d represents the aperture in tire bead for 11.

Numeral 12 represents tire bead and sidewall reinforcement area where buffer item 14 thrusts.

Numeral 13 represents overlap of diagonal, radial and circumferential carcass reinforcement with bead core tube reinforcement 7 extending in a radial direction substantially, whereby the tire sidewall adjacent said bead core tube is extensible circumferentially, but item 7 can overlap all direction tire carcass reinforcement ending extensible area.

Numeral 14 represents the hard end of buffer shell 21 that thrusts against tire reinforced area 12.

Numeral 15 represents airholes in the buffer for air circulation, which keeps the tire air cooler as the rim radiates 300 times faster the heat from tire flexing than the tire radiates heat from enclosed air made hot by tire flexing at high speed. This enables the tire A to make much more mileage than if a tubed tire was enclosed as the tubed tire would prevent air reaching the rim and the enclosing tire would tend to melt on the road rapidly at high speed.

Numeral 16 represents where the silicone like rubber surrounding radial reinforcements 7 terminates.

Numeral 17 represents the biggest aperture in the tire bead and sidewall through which item 8 can be inserted and removed and fastened and unfastened. Numeral 17a represents a lower location in the bead for an aperture than item 11d whereby 17a thus enables item 11 and 11a on item 10 to connect with bead strap to item 6.

Numeral 18 represents a tire sidewall that has a tire bead and sidewall annulus extensible as contrasted with substantially inextensible sidewall 1.

Numeral 19 represents a tire sidewall with slight variations of reinforcement overlap and bead structure from 18.

Numeral 20—20 represent the line from which cross sections in FIGURES 1 and 3 are taken and indicates why the structure shown in FIGURE 3 show broken lines for item 17 connections. 20 in FIGURE 1 represents a cross section of 20—20 of FIGURE 2.

Numeral 21 represents hard buffer shell thrusting against tire.

Numeral 21a represent separation at tire of 21 and 22.

Numeral 22 represents more resilient inner rubber in buffer for greater resistance to distortion and greater restorative power.

Numeral 23 and 24 indicate good locations for item 5.

The current invention is an improvement in prior art for this class of tire in that the best prior tires with extensible beads and sidewall annulus were my prior invention Patent No. 3,172,447 where the substantially inextensible bead strap was secured in a hook shape bead, with some tendency to place uneven strain in said reinforcements, and that bead shape called for new manufacturing tools and machinery. In my subsequent extensible bead and annulus tire Patent No. 3,247,879 the tire had the usual tire reinforcement with the sidewalls and bead reinforcement slit and overlapping and fastenable. This likewise called for new plant tooling.

By contrast the tire invention set forth herein can utilize existing tire manufacturing machinery and tools and provides for reinforcing the sidewalls for the increased wear occasioned by the recently invented sidewall rim flange thrusting buffer. Further one version of this invention provides a method of utilizing an outside tire bead reinforcement that projects to dowel bushings or tapped holes in a strap inside the said hollow beaded tube to be used as the tire core that further simplifies tire manufacture.

Thus from the foregoing it is apparent I have invented improvements in tires and tubeless tires of the extensible tire bead and annulus type whereby more advantages of normal tubeless tire manufacture is retained. This makes possible safer pneumatic wheel assemblies using the improved rim extending flexible buffers that are wide, laterally stable, high that can prevent wheel drop and braking upsets and loss of car control, and that uses less air space, and provides unusual flexibility by a structure that uses the enclosing tire for which use this invention specifically provides.

Several embodiments have been described varying to rim type used and inflation pressure of tires and tonnage of vehicle. The preferred embodiment is therefore that most adapted to the class of use.

Since various modifications will, of course, occur to those skilled in the art without departing from the spirit and scope of the invention, the detailed description of the particular embodiments of the invention illustrated and described herein is not to be construed as limiting the invention thereto. The invention includes all features of patentable novelty residing in the foregoing description and the accompanying drawings.

I claim:

1. In a wheel comprising a rim and a tire, an open beaded pneumatic tire comprising a tread and sidewalls, said sidewalls terminating in beads, each of said beads having a rim contacting surface securable to an airtight compression fit with said rim and one or more of said beads terminating in an extensible bead and sidewall annulus, said tire characterized by having in combination a hollow space in said extensible bead corresponding to the location of usual wire bead cores said extensible bead from the bead outer side having an aperture to said hollow bead core space through which said aperture a substantially inextensible strap having means to fasten to a circular bead core can be drawn into said hollow space as bead reinforcement, and tensioned and fastened to a substantially inextensible bead core.

2. A tire as in claim 1 further characterized by tire carcass radially extending reinforcement means that circle under said extensible bead hollow space and the said reinforcing strap therein and overlap or anchor to a circumferential reinforcement in adjacent sidewall that begins tire carcass any direction reinforcement to a substantially inextensible circumferential wire in the opposite bead or sidewall.

3. A tire as in claim 1 further characterized by thin sidewalls with extra reinforced thickness at the beads said extra bead thickness extending to a point radially less from the wheel axle than the greatest lateral diameter of the enclosing tire, whereby the tire sidewalls near the tire cap do most of the tire flexing under rough road conditions, in a manner similar to that of low profile tires, whereby tire heat up of enclosed air from tire flexing is reduced despite said extra bead and adjacent sidewall reinforcements to provide for use of sidewall thrusting buffers.

4. A tire as in claim 1 further characterized by said substantially inextensible strap consisting of a plurality of severable connectable lengths, each length having a screw threaded hole.

5. A tire as in claim 4 further characterized by addition of an outside tire bead substantially inextensible reinforcement corresponding in shape to the outside shape of said extensible tire bead having means to form a continuously circular bead reinforcement and having means such as pins extending laterally or laterally in a radial slant having means to secure to said substantially inextensible strap located in said bead hollow.

6. A tire as in claim 3 further characterized by means for reinforcing the tire sidewalls and cap circumferentially, radially, and diagonally whereby said radial, circumferential and diagonal reinforcement can terminate at any point in said tire by wrapping said reinforcement around circumferential wire or synthetic reinforcement as a core and said core can be anchored to or overlapped by tire reinforcement extending in any direction.

7. A synthetic tire bead shaped tube constructed to form a circle and being extensible having sufficient heat resistance to melting to be useable as a tire bead core in lieu of usual wire tire bead cores and having a hollow space inside sufficient to enclose an attachable and detachable substantially inextensible tire bead core.

8. An extensible tire bead core as in claim 7 further characterized by a plurality of radial reinforcements of synthetic material of high tensile strength throughout its length whereby said bead core can be stretched over a greater diameter wheel but not extended in its tube shaped perimeter.

9. A tire bead core as in claim 7 further characterized by radial reinforcements impregnated in said tube bead core and extending radially from the greatest circumference of said tire bead core tube to appropriate lengths whereby said bead core tube said extending radial reinforcements can overlap or anchor to circumferential reinforcements at some point in the tire carcass, around which said radial reinforcement structure a circumferentially extensible tire bead and sidewall annulus can be formed.

10. An extensible tire bead core tube and tire structure as in claim 9 further characterized by a tire bead core tube forming a triangular-shaped hollow.

11. A tire structure as in claim 10 further characterized by means to form a tubeless tire with thin sidewalls extending from a thick bead and adjacent sidewall annulus to tire cap whereby a low profile tire effect is secured, said tire having means to reinforce the bead structure by use of an outside bead reinforcement of tire rim retaining flange shape.

12. A substantially inextensible outside tire bead reinforcement conforming to the outside shape of a tire bead rim flange having means extending laterally to radially-laterally to the location of tire bead cores of substantially inextensible material said extending means having means to secure to said tire bead core material whereby dowels or bolts attach to sections of said substantially inextensible tire bead core material holding said tire bead firmly to an airtight fit to a wheel rim.

13. An outside attachable and detachable tire bead reinforcement as in claim 12 further characterized by means for severing the continuous circular shape at one or more points and fastening or unfastening the said severed ends whereby said bead reinforcement can be tensioned to a desired tension around a rim.

14. A tire bead reinforcement as in claim 13 further characterized by means to construct a tubeless tire useable with said outside bead reinforcement.

15. A safety wheel having in combination a rim, a buffer, said buffer enclosed in a tubeless tire mounted on said rim and said tire having one or more extensible beads, an extensible bead tire having means for terminating radial, circumferential and diagonal tire carcass reinforcements in overlaps or wraps around circumferential wheel rolling reinforcements, said circumferential reinforcements located at any radial point in the tire carcass to the greatest tire carcass circumference from which said circumferential reinforcements-radial reinforcements extend to the tire bead, said tire characterized by having in combination said radial reinforcements extending from said tire circumferential reinforcements to said tire bead terminating in said tire bead by anchoring to a form holding material tire bead core section tapped to receive a bolt thread whereby a tire having an extensible bead and adjacent sidewall annulus can be secured to an airtight fit to said rim by bolting or attaching said form holding material tire bead core to an outside tire bead shape rim flange, said outside tire bead shape rim flange reinforcement then functioning as the tire bead inextensible tire bead core securing said tire extensible tire bead to an airtight fit to said rim.

16. A safety wheel as in claim 15 further characterized by said tubeless tire enclosing a sidewall thrusting buffer of the type whereby a hard shell exterior of said buffer bears on the tire sidewall and bead over the greatest circumference of the tire rim retaining flange and upon encountering shock loads jars off said bearing support and thrusts against the tubeless tire sidewall.

No references cited.

ARTHUR L. LA POINT, *Primary Examiner.*

R. A. BERTSCH, *Assistant Examiner.*